Oct. 16, 1951  F. W. JARDON  2,571,721
ARTIFICIAL EYE
Filed Jan. 30, 1948
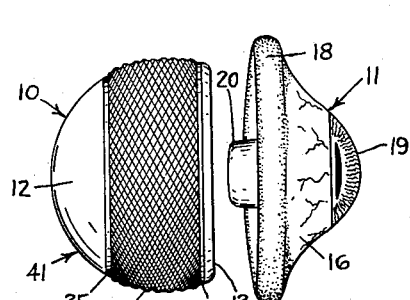
Fig. 1
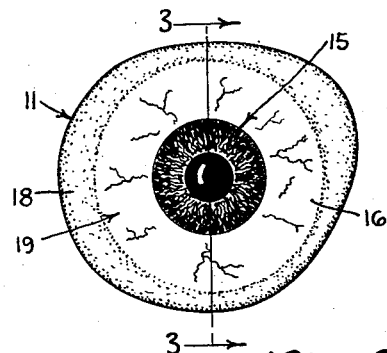
Fig. 2
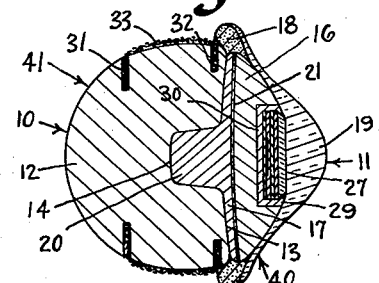
Fig. 3
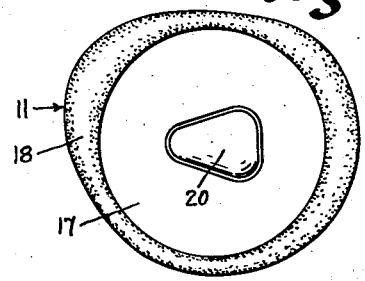
Fig. 4
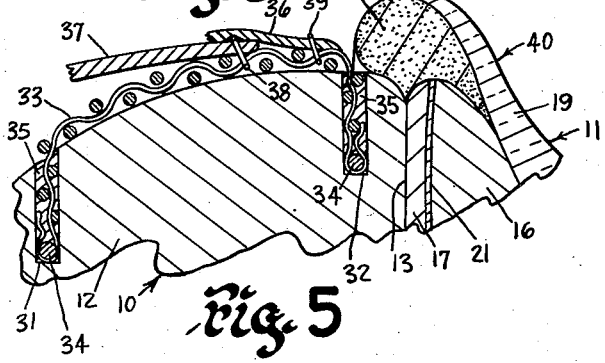
Fig. 5
Fig. 6
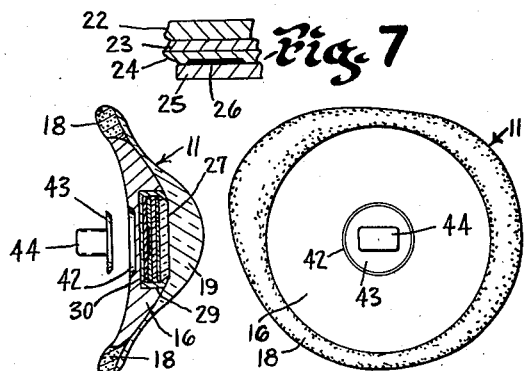
Fig. 7  Fig. 8  Fig. 9
INVENTOR.
FRITZ W. JARDON
BY
ATTORNEY Patented Oct. 16, 1951

2,571,721

UNITED STATES PATENT OFFICE 2,571,721

ARTIFICIAL EYE

Fritz W. Jardon, Southbridge, Mass., assignor to American Optical Company, Southbridge, Mass., a voluntary association of Massachusetts Application January 30, 1948, Serial No. 5,253

21 Claims. (Cl. 3—13)

This invention relates to artificial eyes and more particularly to implant type eyes and method of making the same.

One of the principal objects of the invention is to provide an implant type artificial eye of plastic material having the main eye portion, including the iris pattern and surrounding scleral portion, formed to simulate as closely as possible the normal eye, with said portion removably connected with a plastic insert having means to which the muscular structure of the eye may be directly or indirectly attached, whereby the complete removable portion will move in a manner simulating the movement of a normal eye.

Another object is to provide an eye of the above character having its corneal portion surrounded at least in part by a broader portion having the appearance of the caruncula lachrymalis of the eye.

Another object is to provide an implant portion for eyes of the above character having connecting means in the form of a wire mesh of columbium or tantalum metal, having its edge portions embodied in said implant portion and covering a selected area of said implant portion, whereby the motive muscles such as the various rectus muscles, including the Tenon's capsule and conjunctiva, may be sutured thereto and the tissue growth may interlock therewith.

Another object is to provide, in combination with an implant member of the above character, a removable main eye portion with said implant and main eye portion having interfitting means so formed as to inherently locate the main eye portion in proper position of use.

Another object is to provide an implant of the above character having a front portion formed with interconnecting means with which the main eye portion may be assembled and having metallic mesh surrounding the adjacent area of the implant portion, with the forward edge of said metallic mesh spaced slightly from said forward portion and covering the adjacent sides or intermediate area of the implant with the rear of the implant having no mesh covering thereon.

Another object is to provide an implant member of the above character having only its portion intermediate the front and rear thereof covered with metallic mesh and having its contour edges in secured relation with or imbedded in said implant portion.

Another object is to provide an implant portion of the above character which may be used either with complete eye enucleation or an evisceration type of operation, that is, the said implant portion may be used either with or without a detachable main eye portion.

Another object is the provision of a main eye portion having separate interconnecting means so formed as to permit the main eye portion to be easily adjusted in assembly with the implant portion to enable the main eye portion to be located in a position more nearly resembling the normal eye.

Another object is to provide an artificial eye of the above character whereby the various parts will retain their assembled relation with each other during use.

Further objects of the invention are to provide, as hereinafter set forth, an artificial eye which is simple in its construction and arrangement, durable, thoroughly efficient in its use, readily assembled, natural appearing, light in weight, mobile and non-irritating, as well as impervious to changes in temperature and to socket secretions, resistant to breakage and comparatively economical to manufacture.

Other objects and advantages of the invention will become apparent from the following description taken in connection with the accompanying drawing in which:

Fig. 1 is a side elevational view of an artificial eye formed according to the present invention and showing the main eye portion detached from the implant portion;

Fig. 2 is a front elevational view of said eye;

Fig. 3 is a sectional view of the eye taken on line 3—3 of Fig. 2;

Fig. 4 is a rear elevational view of the main eye portion of the artificial eye;

Fig. 5 is a sectional view illustrating particularly the connecting means for the muscular structure;

Figs. 6 and 7 are enlarged fragmentary sectional views illustrating steps in the process of manufacture and development of the iris portion;

Fig. 8 is a sectional view of the main eye portion of a modified form of artificial eye illustrating particularly the interconnecting means for connecting the main eye portion to the implant portion; and Fig. 9 is a rear elevation of the main eye portion shown in Fig. 8.

The improvements in artificial eyes as herein shown and described are particularly outstanding as compared with known prior art artificial eyes, particularly artificial eyes formed of glass, as such eyes cannot be fitted to the degree of accuracy of the eye of the present invention to more nearly approach the appearance of a normal eye and more particularly the appearance of the normal eye of the particular individual for which the artificial eye is being provided.

The eye embodying the present invention, as distinguished from known prior art artificial eyes which are entirely held in place by the eyelids and the cul-de-sac, is fabricated from carefully selected materials and with structural features enabling the implant portion of said eye to be permanently secured within the patient's eye socket at the time that the patient's deficient eye is enucleated or eviserated.

The said eye further distinguishes from most artificial eyes of the known prior art type in that it is provided with means whereby the motive muscular structure of the eye being removed may be attached to the artificial eye and will impart movements thereto simulating those of the normal eye.

A further distinction is that the eye of the present invention is extremely light in weight, may be altered as to shape so as to meet the requirements of the particular individual and is carefully controlled as to size and color of the iris, pupil, scleral vein pattern, and caruncula lachrymalis so as to resemble the size and appearance characteristics of the normal eye.

The eye is particularly resistant to breakage, will retain its color characteristics and is of such nature as to be non-irritating to the socket tissues and more particularly is greatly resistant to changes in temperature and to socket secretions.

The present artificial eye further distinguishes from the known prior art artificial eyes by embodying novel means associated with and forming a part of the implant portion of the eye to provide for easier and more satisfactory and efficient attachment of the muscular structure to the eye and also to provide an improved means to which the tissues will more easily adhere and grow, to prevent them from growing into a mass in the socket and in time exert a pressure upon the eyeball with the consequent bulging effect unnatural to the normal eye.

A still further distinguishing feature of the present invention is that while the implant portion of the eye is permanently located within the eye socket and cannot be removed except by surgery, the main eye portion may be removed at any time for cleaning or the like or for replacement, and when reinserted and in cooperative engagement with the implant portion will be controlled by the implant portion to move in accordance with the urgings of the muscular structure connected to the implant portion and in harmony with the patient's good eye.

Referring more particularly to the drawing wherein like characters of reference designate like parts throughout the several views, the artificial eye embodying the present invention comprises broadly an implant portion 10 and a separate removable main eye portion 11. The implant portion 10 includes a ball portion 12 molded or otherwise formed to the size and shape desired and is preferably formed of a whitish translucent plastic material, such as methyl methacrylate having white or other desired color pigments added thereto. The said ball portion 12 is preferably molded to shape in a suitable mold by placing the plastic in a doughy state in the mold and then subjecting the said mold to heat and pressure of an amount sufficient to cause the plastic to assume the shape of the mold cavity. It is, of course, to be understood that the mold cavity is of the shape and size desired of the ball portion.

The frontal surface of the ball portion 12 is flattened as indicated at 13 (Figs. 1 and 3) and preferably formed with a narrow internal curvature or concavity having a centrally located deeper depression 14. The depression 14 is adapted to loosely receive an extension formed on the main eye portion as will be hereinafter described and is shaped in substantial coincidence with the external surface of the extension.

The main eye portion 11 includes an iris portion 15 (Fig. 2), a scleral portion 16, a rear disc or cap 17, a peripheral border or caruncula lachrymalis portion 18, and a transparent covering 19.

The scleral portion 16 is molded and colored in a manner similar to the ball portion 12 and is shaped substantially circular to resemble the "white" or scleral portion of a normal eye. The disc or cap 17 is similarly formed and has provided on the rear surface thereof an extension 20 adapted to be loosely inserted in the depression 14 of the ball portion 12. The extension and depression are of matching contours to form a typical male and female type connection wherein the extension forming the male portion of the connection is initially permitted a limited freedom of movement to adjust the main eye portion 11 to the implant portion 10 as will be more clearly described hereinafter. The cap 17 is secured to the rear surface of the scleral portion 16 through the use of a doughy or syrupy cement mixture 21 of a polymer and monomer and may be of essentially the same color as that used in molding the cap 17 and scleral portion 16. The cap 17 and scleral portion 16 are provided with a layer of the mixture 21 therebetween which after the related parts are properly adjusted and when hardened forms a permanent fixative to immovably connect the cap to the scleral portion. The assembly after the mixture has been allowed to harden, may be ground so that the peripheries of the parts will assume a substantially flush relation.

The assembled scleral portion 16 and cap 17 thus form a single unit having formed integral therewith and around the periphery thereof by a second molding operation a peripheral border 18 shaped and colored to resemble the caruncula lachrymalis of the normal eye. This peripheral border 18 could, if desired, be formed integral with the main eye portion simultaneous to the forming of said portion. Zinc oxide may be used with vermilion red, burnt umber, hommel vitreous blue, or any other mixture may be used to obtain the pinkish flesh color effect of the caruncula lachrymalis of a normal eye. This second molding operation results in an eye of predetermined size and shape as determined by the use of trial eyes inserted in the patient's eye socket, with the mold being made from the selected trial eye, thus assuring a naturally comfortable relation between the artificial eye and the socket. The border 18 also serves to provide a larger surface area to assist the eyelids in retaining the main eye portion in position, as will be seen more clearly hereinafter.

In the front of the scleral portion 16 there is formed a countersink or recess in the position where the iris 15 is to be located and is of substantially the same diameter as the iris to be formed in the resultant eye.

The iris portion 15 is preferably a photograph of the good eye of the individual or is a photograph selected from a stock of negatives and which possesses the major characteristics of the individual's good eye. From this negative a positive is formed on a transparent stripping film. This particular type of film, as shown diagrammatically in Fig. 7, has a relatively thick backing 22 of cellulose acetate adapted to support a superimposed very thin layer 23 of cellulose nitrate. On the layer of cellulose nitrate there is a layer 24 of gelatin which contains photographic materials such as a photosensitive compound. Other compounds such as bromide or iodide or mixtures thereof may be used which, when exposed and developed, will cause the layer to contain a photographic picture of the eye in different tones varying from black to the transparent depending upon the photographic pattern of the iris.

The color effect of the iris of the good eye is reproduced on this film by suspending an inorganic pigment in a syrupy liquid consisting of methyl methacrylate polymer dissolved in methyl methacrylate monomer or partially polymerized methyl methacrylate which may contain a plasticizer such as dibutyl phthalate or the like. The color of the inorganic pigment used, of course, is selected according to the color of the eye to be produced and one or more of several different colors may be used and placed on the gelatin layer containing the photographic picture of the iris by painting or brushing streaks or bands of said color or colors thereon depending upon the effect to be produced. The pigment is essentially opaque and thereby causes the pigmented coating 25 resulting from the above to be an opaque layer.

It is to be understood, of course, that the pupil, indicated at 26, is first produced on the film by applying a coating of black pigment in a syrupy liquid to the pupil area of the photographic film after which the pigmented coating 25 is applied or the pupil may be produced photographically, thereby requiring no painting. In instances when it is painted a transparent pupil area is formed during the photographic process. The pupil area is controlled in size during the forming thereof so as to appear to be substantially the size of the pupil of the normal eye under normal conditions of use. If desired the pupil may be in the form of an opening of the diameter of the pupil desired and having a coating of black pigment in a monomer polymer mixture placed in the back of the opening.

The monomer which acts as a solvent for the pigmented layer partially evaporates after being applied to the film and is partially converted into polymerized form by a curing process which takes place during the heating and compressing of the eye during the final forming thereof.

The coated layer of cellulose nitrate 23 having the pigmented coating 25 thereon is then stripped off the cellulose acetate backing 22 and is cemented to a small bevelled transparent plastic disc 27, as diagrammatically shown in Fig. 6. The nitrate layer is preferably secured to the disc 27 by a coating of cement 28 of the same syrupy solution that the pigments are suspended in and is preferably secured to the disc 27 with the pigmented coating on the side of the nitrate layer 23 opposite the disc 27.

The edges of the stripped-off portion are then removed so as to cause the iris portion to conform to the contour of the disc which is substantially of the size of the finished iris to be formed. For example, the portion of the film having the iris developed thereon may be in the form of a square piece with the iris centrally thereof. When this is attached to the disc, the square portion is then cut away about the contour of the iris.

The disc 27 having the iris portion secured thereto is then secured in the recess in the front of the scleral portion 16 through the use of a doughy mixture 29 of a polymer and monomer essentially the same as that used in molding the scleral portion 16. The disc 27 is pressed into the doughy mixture within the said recess with a sufficient amount of pressure to cause the doughy mixture to ooze out around the sides of the disc 27, leaving a very thin underlayer 30 and causing the outer surface of the disc to assume a substantially flush relation with the adjacent outer surface of the scleral portion 16. Care is taken that the doughy mixture completely fills the space surrounding the disc 27. The excess portion of the doughy mixture which oozes out is removed and the eye at this stage is set aside to permit the doughy mixture to harden. This takes place mostly by evaporation at room temperature.

The assembly, after the doughy mixture has been allowed to harden, may be ground down to cause the surface of the oozed-out portion to assume a relatively smooth, flush relation with the outer surface of the disc 27 and the adjacent outer surface of the scleral portion 16. The effect of the bevelled contour edge of the disc 27 is to cause the insert surrounding the said disc to be of a wedge sectional shape with the result that the wedge increases the density as it progresses outwardly from its upper edge.

At the completion of forming the scleral portion 16 with the iris insert and the peripheral border 18 or caruncula lachrymalis, the scleral portion, after having been properly finished by smoothing or grinding or other desirable surfacing, may be tinted to match the scleral portion of the normal eye. This is accomplished by painting a vein structure on said scleral portion simulating the visible vein structure of the normal eye, using pigments of the proper color in water which contains a suitable wetting agent such as soap or other known commercial wetting agents, that is, any known material which lowers the surface tension of water and which would have no injurious effect on the plastic. The scleral portion may also be tinted where most of the vein structure is located by using a suspension of pigments of the proper color in a methyl methacrylate monomer such as mentioned above and achieves the effect of many small practically invisible veins. The coating resulting from this tinting is then allowed to dry and harden and the outer surface of the scleral portion is then smoothened as mentioned above. The vein structure may also be formed by a solution such as described above for tinting the sclera.

The outer transparent layer or covering 19 is formed by placing a deposit of a doughy polymer and monomer mixture over the iris insert 15, the exposed surface of the scleral portion 16 and a portion of the peripheral border 18 as shown in Fig. 3. This is accomplished by placing a deposit of said doughy mixture in a mold having a mold aperture therein of the shape desired of the final main eye portion 11, that is, the shape of the outer surface of the transparent coating 19, and then compressing the main eye portion having the iris insert 15 therein into said mold under the action of heat and pressure to cause the doughy polymer and monomer mixture to flow to the shape of the mold cavity. The parts are held in this relation under heat and pressure for a time interval sufficient to cause the complete assembly to join into a homogeneous structure with the said plastic compositions hardened through the completion of polymerization and causing the complete curing of the iris and pigmented coatings.

The molded eye portion is then removed from the mold, which mold may be of any conventional type not shown. The outer surface may be rough and slightly misshapen. To bring the eye back to the shape desired the outer surface is ground to remove the unwanted portion of clear or transparent plastic and the said eye is then provided with a smooth polished surface of the shape desired.

The resultant eye, therefore, will be essentially of a plastic composition having a clear transparent coating overlying the iris and being curved substantially to the curvature of the cornea of the normal eye, thereby causing said resultant eye to possess substantially the same visible characteristics as the corneal portion of said normal eye.

One of the unique advantages of the present construction is that the various parts of the eye are formed of plastic material having substantially the same coefficient of expansion so that the shrinkage taking place during the forming of the eye will be substantially uniform so that there is less tendency or danger of separation of the various parts throughout their contiguous surfaces.

It is particularly pointed out that the structure set forth above with reference to the main eye portion comprises several parts fused into one so that the finished product is a one-piece all plastic removable main eye portion having three dimensional characteristics with depth similar to the real or normal eye of the individual and possesses substantially the same color characteristics of said eye including the caruncula lachrymalis.

Although methyl methacrylate has been referred to above as the preferred artificial plastic used in forming the eye, other known artificial resins may be used such as acrylic resins, methacrylic resins, methyl acrylate, butyl acrylate, polystyrene or the like or any known artificial resins capable of withstanding eye secretions and which, under conditions of use, will not irritate the socket tissues.

The ball portion 12 of the implant portion 10 is formed to substantially the shape and size of the eye of the individual which is to be replaced and the surface of said portion 12 is preferably given a rough texture as by grinding or sanding.

Suitable circumferential slots 31 and 32 are formed in the ball portion 12 in spaced parallel relation with each other as shown in Figs. 3 and 5 and serve to receive the opposed edges of a metallic wire mesh 33 formed preferably but not necessarily of columbium of tantalum metal and circumferentially covering part of the ball portion 12 in the manner of a belt, the mesh being of any desired width and adapted to cover any desired part of the ball portion 12 preferably encircling the ball portion centrally and slightly forwardly thereof. The edges of the mesh 33 may be suitably secured within the slots 31 and 32 and are shown as being anchored in place by means of circumferentially extending wires 34, the wires being of a diameter nearly approaching the width of the slots and when forced down into the slots with the edges of the mesh they serve to tauten the exposed surface of the mesh and to retain the edges of the mesh in the slots. After the edges of the mesh are anchored in the slots, the slots are completely filled with a doughy mixture 35 (Fig. 1) of a polymer and monomer essentially the same as that used in moulding the ball portion 12. The slots are filled with a sufficient amount of the doughy mixture to bring the surface flush with the adjacent contour surface of the ball portion 12 and the mixture allowed to harden, thus sealing the edges of the mesh permanently in place. This mesh is used in attaching the motive muscles of the eye to the ball portion 12. It is particularly pointed out that the implant portion 10, which in the subject invention includes the mesh 33, is shaped so that when placed within the cavity of the eye of the individual for whom the artificial eye has been formed, it will have substantially the same freedom of movement as the normal eye and the mesh 33 constituting a part of the implant portion 10, as set forth above, is used as attachment means for securing the external and internal rectus muscles as well as the superior and inferior rectus muscles to said implant portion.

The method employed in removing the eye of an individual and of replacing said eye with an artificial eye embodying the present invention is substantially as follows:

A cut is formed through the conjunctiva about the contour of the cornea of the eye to be removed. The conjunctiva, illustrated diagrammatically at 36, is then rolled backwardly of the sclera to expose the external and internal rectus muscles as well as the superior and inferior rectus muscles, the muscles being designated by numeral 37 in the drawing appended hereto.

A very fine tantalum wire 38 is then threadedly attached to each of the muscles adjacent their point of connection to the eyeball. Each muscle is then cut clear of the eyeball after the tantalum wire is attached thereto and the eyeball is then removed from the socket.

The implant portion 10 of the artificial eye embodying the present invention is then selected and placed in the socket. The muscular structure is then attached to the portion 10 by stitching the tantalum wires 38 through the openings in the mesh 33 in such a manner as to sew the ends of the muscles 37 to the mesh 33. This securely attaches each of the respective muscles to the implant portion 10.

After all the muscles have been attached to the implant portion 10 of the artificial plastic eye as set forth above, tantalum wire is threaded through the Tenon's capsule (not shown) adjacent the location where the capsule joins the conjunctiva, that is, adjacent the points of connection of the muscles with the eyes. The conjunctiva 36 is then drawn upwardly over the implant portion 12 of the eye to a point slightly to the rear of the frontal edge thereof by forming sutures therein as indicated at 39 to connect the conjunctiva to the mesh 33.

The eye tissues are then allowed to heal whereupon the conjunctiva will assume a relatively taut intimate overlying relation with the implant portion of the eye and the said portion, reacting to the normal functions of the muscles attached thereto, will move in a manner simulating the movements of a normal eyeball. The said portion will permanently remain in position in the eye socket and will possess all of the motive functions of the normal eyeball.

Due to the fact that the surface of the mesh 33 is formed with openings and of a relatively rough texture, the tissues of the eye socket will tend to adhere and grow thereto rather than becoming massed within the cavity behind the artificial eyeball, thus causing the said eye to have a relatively normal function.

At any time after securing the conjunctiva to the implant portion 12 the main eye portion may be inserted in the eye socket with the extenson 20 engaging the recess or depression 14. The cap 17 of the main eye portion will thus abut the frontal concave surface of the implant portion 10 with the caruncula lachrymalis overhanging slightly the frontal outer contour edge of the portion 10, and the eyelids are then permitted to close over the main eye portion similar to a normal eye, the eyelids being sufficient to retain the main eye portion 11 in cooperative relation with the implant portion 10. When assembling the cap portion 17 having the projection 20 thereon with the scleral portion 16, and prior to the allowing of the syrupy cement 21 to set or harden the said projection portion 20 may be adjusted laterally or its longitudinal axis tilted with respect to the scleral portion in order to locate the iris of the eye in proper position. This is accomplished either by initially forming the cap portion 17 slightly smaller in diameter than the inner dimension of the cavity or rear surface of the scleral portion 16 on which it is seated or by trimming the edges of the cap portion 17 and fitting it to the rear of the scleral portion. The projection 20 can thus be located in proper position with respect to the iris. To alter the angle of the longitudinal axis of the projection 20 with respect to the scleral portion a coating of cement 21 slightly in excess of the final thickness desired may be placed on the rear of the scleral portion and the cap portion held in proper angular relation with respect to said scleral portion while being pressed inwardly of said layer of cement. When the cement sets and hardens it will retain the projection 20 in fixed adjusted position.

Thus, the completely assembled artificial eye will posses all of the motive functions and appearance of the normal eye.

Although applicant has referred to specific means and method of securing the muscles to the eyeballs, and for securing the main eye portion to the implant portion, it is to be understood that various different means and methods may be employed within the scope of the invention. A modification of the means for connecting the main eye portion 11 to the implant portion 10 is disclosed in Figs. 8 and 9 wherein a cavity 42 is formed directly in the rear surface of the scleral portion 16 of the portion 11 and adapted to adjustably receive the flared flattened end portion 43 of a projection 44 which may be cemented in the cavity by a suitable mixture such as hereinbefore recited, the projection being shaped to coincide with the internal shape of the depression in the frontal surface of the implant portion of the artificial eye with which it is to be related.

It is apparent that the projection 43, when being secured to the main eye portion may be adjusted laterally or may be angled with respect to said main eye portion as desired and according to the requirements of the individual to whom the eye is being fitted and according to the position in which the eye is to be supported in the socket. This provides means whereby any desired adjustment may be made to control the position of the iris according to the requirements of the individual.

The implant portion 12 tapers or curves rearwardly as indicated at 41 to provide clearance whereby the said portion will have free universal movement in the socket whereby it will respond more easily to the full extent of movement imparted by the motive muscles. The implant portion 12 with the attached mesh 33 functions to fill in the cavity formed by removing the human eye and serves to retain the tissues of the socket in place and to cause the front or main eye portion 11 of the eye to assume a position simulating that of the normal eye in its socket, that is, it prevents the sclera or cornea of the artificial eye from being set in or protruding outwardly too far with respect to the related position of the normal eye.

Although the implant portion has been described above as being employed with the enucleation technique, it is to be understood that the implant may be used with the eviseration technique wherein, instead of completely removing the eyeball while retaining the muscles intact and attaching them directly to the eyeball, an incision is made between the inferior and superior or lateral and medial rectus. The interior of the eyeball is then removed. A circumferential incision is made around the iris portion and the said iris is then removed. The implant is inserted through the incision with its frontal portion protruding through the iris window. The incision is sutured to the tantalum mesh. The conjunctiva is subsequently drawn about the front of the implant by a purse string type suture. Upon healing the tissues of the eye grow into bonded relation with the mesh of the implant portion of the eye and thereby indirectly connects the muscular structure to the implant.

It is to be understood that in this latter case the frontal part of the implant portion may, if desired, be provided with an integrally protruding portion in which the recess or socket 14 may be formed for receiving the projection of the main eye portion and the conjunctiva is drawn about the periphery of the protrusion.

From the foregoing description it will be seen that simple, efficient and economical means and methods have been provided for accomplishing all of the objects and advantages of the invention.

It will be apparent that many changes may be made in the details of construction and arrangement of parts shown and described without departing from the spirit of the invention as expressed in the accompanying claims. Therefore, it is to be understood that all matter set forth or shown in the accompanying drawing is to be interpreted as illustrative and not in a limiting sense.

I claim:

1. An artificial eye comprising an implant portion shaped for insertion within the eye socket of an individual, a removable main eye portion cooperatively associated with said implant portion and having a scleral portion with an iris implant simulating that of the normal eye, a border portion associated with said scleral portion to simulate the caruncula lachrymalis of a normal eye, and means for adjustably connecting said main eye portion to said implant portion comprising an extension formed on the rear surface of said main eye portion, and a recess formed in the frontal surface of said implant portion, said extension being adapted to reside in said recess to locate the main eye portion in proper position of use.

2. The method of forming an artificial eye comprising shaping an implant portion to fit within the socket of an eye which has been removed, shaping a second portion to simulate the scleral portion of a normal eye and securing with it an iris simulating the iris of a normal eye, shaping additional material about said scleral portion to form a border portion simulating the caruncula lachrymalis of a normal eye, and mounting said second portion on the implant portion.

3. An artificial eye comprising an implant portion shaped for insertion within the eye socket of an individual, a removable main eye portion cooperatively associated with said implant portion, and a sheath of a foraminous nature secured about said implant portion and to which the motive muscular structure of the eye being replaced by said artificial eye may be attached.

4. An artificial eye comprising an implant portion shaped for insertion within the eye socket of an individual, a foraminous sheath carried by said implant portion for attachment of the motive muscular structure of the eye, a main eye portion cooperatively associated with said implant portion and having a scleral portion and an iris portion simulating said portions of the normal eye, and means for removably connecting said main eye portion to said implant portion.

5. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, and connection means of a foraminous nature adapted to be disposed circumferentially over the surface of said implant portion between said channels, having its edges imbedded in the channels, and adapted for attachment of the motive muscular structure of the eye.

6. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, and connection means of a foraminous nature adapted to be disposed circumferentially over the surface of said implant portion between said channels, having its edges imbedded in the channels, and adapted for attachment of the motive muscular structure of the eye, said main eye portion having a scleral portion and an iris portion simulating said portions of the normal eye, and a border portion associated with said scleral portion to simulate the caruncula lachrymalis of the normal eye.

7. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, connection means of a foraminous nature adapted to be disposed circumferentially over the surface of said implant portion between said channels, having its edges imbedded in the channels, and adapted for attachment of the motive muscular structure of the eye, and means for adjustably connecting said main eye portion to said implant portion comprising an extension formed on the rear surface of said main eye portion, and a recess formed in the frontal surface of said implant portion, said extension being adapted to reside in said recess to locate the main eye portion in proper position of use.

8. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, connection means of a foraminous nature adapted to be disposed circumferentially over the surface of said implant portion between said channels, having its edges imbedded in the channels, and adapted for attachment of the motive muscular structure of the eye, said main eye portion having a scleral portion and an iris portion simulating said portions of the normal eye, and a border portion associated with said scleral portion to simulate the caruncula lachrymalis of the normal eye, and means for adjustably connecting said main eye portion to said implant portion comprising an extension formed on the rear surface of said main eye portion, and a recess formed in the frontal surface of said implant portion, said extension being adapted to reside in said recess to locate the main eye portion in proper position of use.

9. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, connection means of a foraminous nature adapted to be disposed circumferentially over the surface of said implant portion between said channels, having its edges imbedded in the channels, and adapted for attachment of the motive muscular structure of the eye, and means for detachably connecting said main eye portion to said implant portion, said means comprising a connection portion securable to the rear surface of said main eye portion and having an extension adapted to fit within a recess formed in the frontal surface of said implant portion, the position of said connection portion on the rear surface of the main eye portion being variable according to the desired final related position of said main eye portion with respect to said implant portion, and means for securing said connection portion in said related position.

10. An artificial eye comprising an implant portion shaped for insertion within the eye socket of an individual, a main eye portion cooperatively associated with said implant portion, said implant portion having a circumferential channel formed therein and spaced slightly rearwardly of the frontal surface thereof and a second channel spaced parallel to and rearwardly of said first channel, connection means of a foraminous nature adapted to be disposed circumferentially over the surface of said implant portion between said channels, having its edges imbedded in the channels, and adapted for attachment of the motive muscular structure of the eye, said main eye portion having a scleral portion and an iris portion simulating said portions of the normal eye, and a border portion associated with said scleral portion to simulate the caruncula lachrymalis of the normal eye, and means for detachably connecting said main eye portion to said implant portion, said means comprising an extension mountable on the rear surface of said main eye portion and adapted to fit within a recess formed in the frontal surface of said implant portion, the position of said extension relative to said rear surface of the main eye portion being adjustable to permit said main eye portion to assume a desired related position with respect to said implant portion when in connected relation therewith, and means for mounting the extension on said rear surface of the main eye portion in said position.

11. The method of forming an artificial eye comprising shaping an implant portion to fit within the socket of an eye which has been removed, detachably securing a representation of the natural eye to the front side of said implant portion, and securing a sheath of foraminous material circumferentially over the surface of said implant portion for attachment of the motive muscular structure of the eye.

12. The method of forming an artificial eye comprising shaping an implant portion to fit within the socket of an eye which has been removed, adjustably attaching a representation of a natural eye to said implant portion, channelling circumferentially said implant portion, disposing a sheathing of foraminous nature circumferentially over the surface of said implant portion for attachment of the motive muscular structure of the eye, and fixedly securing an edge portion of said foraminous sheathing within said channel.

13. The method of forming an artificial eye comprising shaping an implant portion to fit within the socket of an eye which has been removed, detachably securing a main eye portion to said implant portion, circumferentially channelling said implant portion to form a pair of encircling channels, disposing connection means of a foraminous nature circumferentially over the surface of said implant portion between said channels for attachment of the motive muscular structure of the eye, fixedly securing the edge portions of said connection means within said channels, and forming a border portion about said main eye portion simulating the caruncula lachrymalis of a normal eye.

14. The method of forming an artificial eye comprising shaping an implant portion to fit within the socket of an eye which has been removed, circumferentially grooving said implant portion to form spaced channels thereabout, disposing connection means of a foraminous nature circumferentially over the surface of said implant portion between said channels for attachment of the motive muscular structure of the eye, fixedly securing the edge portions of said connection means within said channels, and adjustably connecting a main eye portion simulating the external appearance of the removed eye to said implant portion by the steps of locating a cap member on the rear surface of said main eye portion having a tongue member on the rear surface thereof, forming a recess in the frontal surface of said implant portion for reception of said tongue, and securing said cap member to the main eye portion.

15. The method of forming an artificial eye comprising shaping an implant portion to fit within the socket of an eye which has been removed, circumferentially grooving said implant portion to provide spaced channels thereabout, disposing connection means of a foraminous nature circumferentially over the surface of said implant portion between said channels for attachment of the motive muscular structure of the eye, fixedly securing the edge portions of said connection means within said channels, shaping material to provide a main eye portion having a scleral portion to simulate the scleral portion of a normal eye and a border portion simulating the caruncula lachrymalis of a normal eye, assembling an iris portion therewith and locating on and securing to the rear surface of said main eye portion a cap member having a tongue member, and forming a recess on the frontal surface of said implant portion for reception of said tongue.

16. An artificial eye comprising an implant portion shaped for insertion within the eye socket of an individual and having formed therein a pair of spaced circumferential channels, a main eye portion cooperatively associated with said implant portion, and connection means of a foraminous nature carried by said implant portion and to which the motive muscular structure of the eye being replaced by said artificial eye may be attached, said connection means being disposed circumferentially over the surface of said implant portion between said channels and having edge portions thereof imbedded in the channels.

17. An artificial eye comprising an implant portion shaped for insertion within the eye socket of an individual and having formed therein a pair of spaced circumferential channels, a main eye portion cooperatively associated with said implant portion, connection means of a foraminous nature carried by said implant portion and to which the motive muscular structure of the eye being replaced by said artificial eye may be attached, said connection means being disposed circumferentially over the surface of said implant portion between said channels and having edge portions thereof imbedded in the channels, means for attaching said connection means to said implant portion embodying retaining members adapted by wedging action to confine the edges of said connection means within the respective channels, and fillers of plastic material adapted to be disposed within said channels about said retaining members and said edges to imbed said members and said edges and to seal the channels.

18. An artificial eye comprising an implant member shaped for insertion in the eye socket of an individual, a main eye member having a simulation of a naturel iris visible from the forward side thereof, said main eye member having a recess on the rear side thereof and a connection member having a disc-like portion for securement in said recess on the rear side of said main eye member, said disc-like portion of the connection member and implant member having cooperative means embodying a pin and socket whereby said main eye member may be readily attached and separated from the implant member when said disc-like portion of the connection member is in secured relation therewith.

19. An artificial eye comprising an implant member shaped for insertion in the eye socket of an individual, a main eye member having a simulation of a natural iris visible from the forward side thereof, said main eye member having a depressed area on the rear side thereof, and a connection member having a disc-like portion for securement in said depressed area on the rear side of said main eye member, said disc-like portion of the connection member having an extension to detachably fit within a recess formed in the front surface of the implant member whereby said main eye member may be readily attached to and separated from the implant member when said connection member is in secured relation therewith.

20. An artificial eye comprising an implant member shaped for insertion in the eye socket of an individual and having a recess in the forward side thereof, a main eye member having a simulation of a natural iris visible from the forward side thereof, and a connection member embodying a disc-like portion fixedly secured to the rear side of said main eye member, said connection member having a portion of reduced section extending from said disc-like portion thereof and adapted to detachably fit in said recess in the forward side of the implant member whereby said main eye member may be readily attached to and separated from the implant member.

21. An artificial eye embodying a ball portion for insertion in the eye socket of an individual, and a sheath of foraminous nature carried by said ball portion and to which the motive muscular structure of the eye being replaced may be attached.

FRITZ W. JARDON.

REFERENCES CITED

The following references are of record in the file of this patent:

UNITED STATES PATENTS

| Number | Name | Date |
|---|---|---|
| 2,322,117 | Dimitry | June 15, 1943 |

FOREIGN PATENTS

| Number | Country | Date |
|---|---|---|
| 19,625 | Great Britain | Nov. 1, 1892 |

OTHER REFERENCES

Ruedemann, A. D., "Plastic Eye Implant," American Journal of Ophthalmology, August 1946, pages 947–952.

"Archives of Ophthalmology," volume 37, #1, January 1947, pages 73, 74 and 78; "A Positive Contact Ball and Ring Implant for Use After Enucleation," by N. L. Cutler. (A copy is in Div. 55 of the Patent Office.)